Feb. 21, 1967   J. C. JUREIT   3,305,252
CORNER CONNECTOR
Filed Nov. 21, 1962   2 Sheets-Sheet 1

INVENTOR.
JOHN C. JUREIT
BY
Le Blanc and Shur
ATTORNEYS

Feb. 21, 1967 J. C. JUREIT 3,305,252
CORNER CONNECTOR
Filed Nov. 21, 1962 2 Sheets-Sheet 2

INVENTOR.
JOHN C. JUREIT
BY
*Le Blanc and Shur*
ATTORNEYS

United States Patent Office 3,305,252
Patented Feb. 21, 1967

3,305,252
CORNER CONNECTOR
John C. Jureit, Miami, Fla., assignor to Automated Building Components, Inc., Miami, Fla., a corporation of Florida
Filed Nov. 21, 1962, Ser. No. 239,220
1 Claim. (Cl. 287—20.92)

This application is a continuation-in-part of co-pending application Serial No. 725,385, filed March 31, 1958 and now abandoned.

The present invention relates to metallic corner and connector brackets and joints and more particularly to a unitary metallic corner connector having integral nails or teeth for forming angled wood stress bearing joints.

Metallic connectors comprising a metal body from the side of which a plurality of slender elongated teeth or nails project, as a result of being struck directly from the metallic body, are disclosed and illustrated in my U.S. Patent No. 2,877,520. Such connectors are utilized for forming a structural joint by joining two pieces of structural load bearing wooden members.

In spite of the advantages which result from the connectors disclosed in the patent, their use has been heretofore limited to flat connectors and flat joints. In the metallic connectors of my above-mentioned patent, the nails depend downwardly from the metallic plate all at the same angle so that if the plate is bent to fit into a corner, the nails are disposed at right angles one to the other and, therefore, it is impossible to drive the nails associated with the two arms of the plate at the same time. Further, since the nails cause the metal base to stand off from the structure if the nails arranged along one arm are first driven, then it is impossible to drive the nails arranged along the other arm without materially deforming the arm of the plate already secured to the structure.

It is, therefore, an object of the invention to provide a metallic corner connector having a plurality of teeth integral therewith which may be readily applied to angularly related surfaces of two or more members.

It is another object of the present invention to provide a metallic corner bracket or connector having a plurality of nails integral therewith which is low in price and which may be applied to the two or three surfaces of a structure which intersect at an angle with respect to one another.

The above and still further objects, features and advantages of the present invention will become apparent upon consideration of the following detailed description of specific embodiments thereof, especially when taken in conjunction with the accompanying drawings, wherein.

Figure 1:
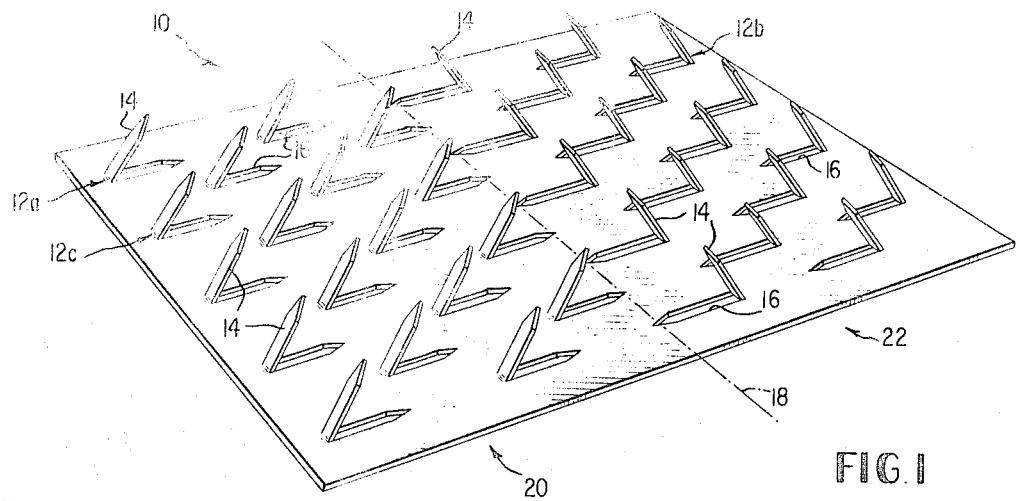
FIGURE 1 is a perspective view of the connector of the present invention adapted to be applied to an inside corner of a structure.

Referring specifically to FIGURE 1, there is illustrated a metal plate 10 having a plurality of rows 12a, 12b, 12c, etc. of nails or teeth 14 struck from the plate 10. The nails 14 are preferably arranged in staggered fashion in a plurality of columns transverse to the rows such that the center of each nail is adjacent the center of the metal between the teeth of adjacent rows. As indicated above the teeth are struck from the metal plate 10 so that there is an aperture 16 in the plate 10 corresponding to each tooth and terminating at the root of its associated tooth or nail.

The plate 10 is divided into two groups of teeth 14 with a first group 20 lying to the left of an imaginary line designated by the reference numeral 18 and a second group 22 of teeth 14 lying to the right of the imaginary line 18 all as viewed in FIGURE 1. All of the teeth 14 form an angle less than 90° with the plate 10, with all of the teeth in group 20 forming the same angle with respect to plate 10 and being directed toward the line 18 while all of the teeth in group 22 form the same angle with respect to the plate 10, the angle being the supplement of the angle which the teeth of group 20 form and, therefore, the teeth of group 22 are also directed toward the line 18. As shown in FIGURE 1 the teeth are struck in opposite directions on each side of line 18 and are actually bent through equal acute angles of less than 90° from plate 10. Conversely, the teeth on both sides of line 18 may be struck in the same direction with those on one side of line 18 bent through an obtuse supplemental angle from plate 10 to the position shown in FIGURE 1.

The angle between the teeth 14 and the plate 10 is determined by the angle between the two surfaces of a structure to which the bracket or connector is to be applied. Specifically, the angle between the teeth 14 and the plate 10 is equal to one-half of the angle between the two surfaces to be engaged by the plate. Thus, if the two surfaces to be joined or braced are at right angles to one another the angle between the teeth 14 and the plate 10 must be 45° whereas if the angle between the two surfaces is 135°, the angle between the teeth and the plate 10 must be 67½°.

Figure 2:
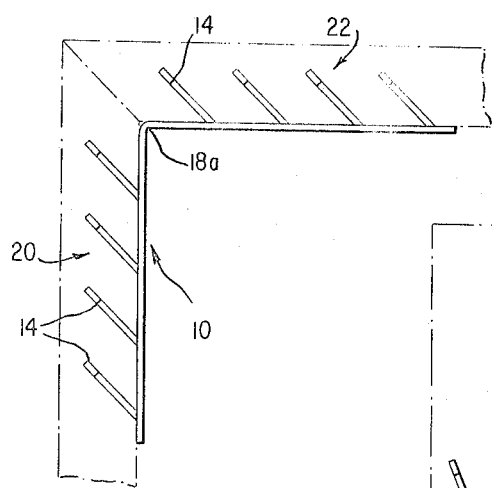
FIGURE 2 is a cross-sectional view of the connector of the invention applied to two surfaces disposed perpendicular to one another.

Referring specifically to FIGURE 2 of the accompanyings, the connector of the present invention is illustrated as applied to two surfaces of a structure which are disposed at 90° with respect to one another. In order to prepare the plate 10 for application to the structure, the plate is bent along the line 18 of FIGURE 1 in a direction such that the surfaces on either side of the line which do not have teeth depending therefrom are rotated toward one another until the two portions of the plate lying on the opposite side of this line are at an angle with respect to one another equal to the angle between the two surfaces to be contacted. In the present case, this is 90°. If the teeth 14 on either side of the plate are struck so that they lie at 45° with respect to the plate 10 and the teeth on opposite sides of the plate are directed toward one another, then upon bending of the plate as indicated as 18a along the line 18 at 90° the teeth 14 are all parallel to one another regardless of where they are located on the plate 10; that is, whether they are located on one side of the line 18 or the other. In consequence of the fact that all of the teeth are parallel to one another, the plate may be driven as a unit into the wood along the two members which meet at an angle with respect to one another.

Figure 3:
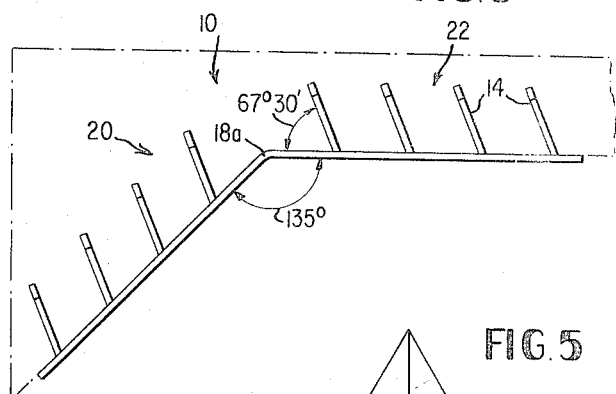
FIGURE 3 is a cross-sectional view showing the structure of the present invention applied to the surface of two members which meet at an angle other than 90°.

Referring now to FIGURE 3 of the accompanying drawings, there is illustrated a structure in which the plate of the present invention is applied to the two surfaces of a structure which meet at an angle of 135°. In this instance, the angle between the teeth 14 and the plate 10 is 67½° or, as indicated above, one-half of the angle between the surfaces to be contacted by the plate 10. Again when the plate 10 is bent to the proper angle along the line 18 all of the teeth 14 are parallel to one another and the plate 10 may be driven as a unit. It is thus seen that the present invention provides a corner connector or brace which has a plurality of teeth integral therewith but which teeth may be made parallel to one another regardless of the angle of the plate. That is, the angle formed by the plate may be either an obtuse angle or an acute angle and the teeth may project from the obtuse angle forming surface or from the acute angle forming surface. In consequence the plate may be applied to angularly related surfaces in a single nailing operation. Since the teeth must be set at an angle having a predetermined relationship to the angle of the two portions of the plate 10 with respect to one another, the angle of the teeth with respect to the plate 10 is normally determined at the time of manufacture although relatively rough changes in these angles may be made by a workman on the job.

Figure 4:
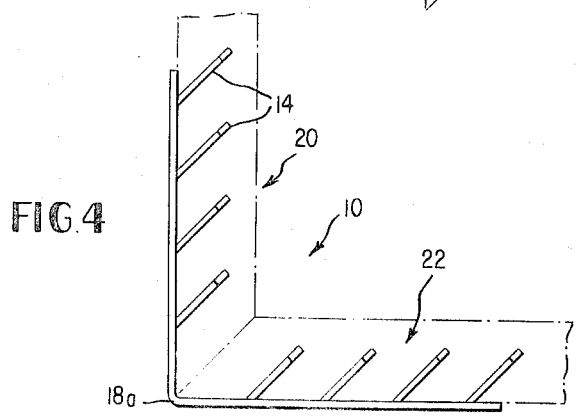
FIGURE 4 is a cross-sectional view showing the connector or bracket of the present invention applied to an outside corner of a structure.

Referring specifically to FIGURE 4 of the accompanying drawings there is illustrated a connector adapted to be applied to a 90° outside corner of a srtucture. In this figure, the teeth are again disposed at 45° with respect to the plate 10 but in this embodiment the angle is made with the portion of the plate lying on the side of the teeth remote from the line 18 rather than a portion of the plate adjacent to the line 18. In other words, the angle between the teeth 14 and the plate 10 in the embodiment of FIGURE 4 is the supplement of the angle between these members illustrated in FIGURES 1 and 2. It can be seen that again all of the teeth 14 are parallel to each other and the bracket may be readily applied to the corner.

Figure 5:
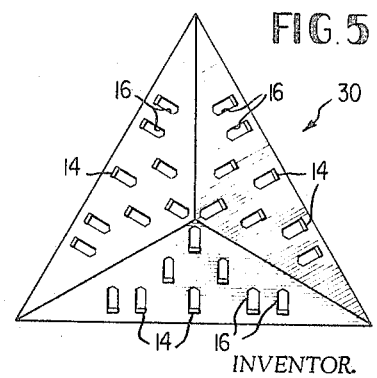
FIGURE 5 is a plan view of a modified form of the connector of the present invention adapted to be applied to an inside corner intersection of three surfaces.
Figure 6:
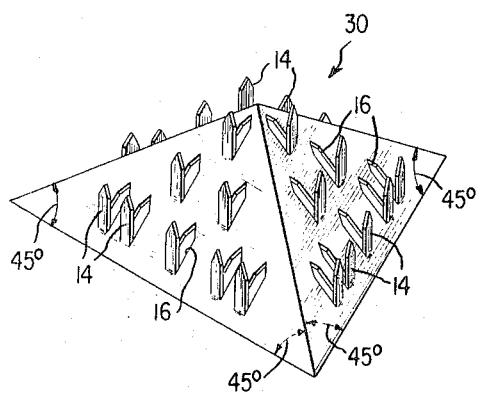
FIGURE 6 is a perspective view of the connector shown in FIGURE 5.
Figure 7:
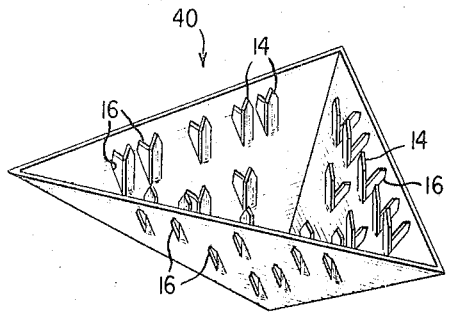
FIGURE 7 is a perspective view of a connector similar to that of FIGURE 6 for an outside corner intersection of three surfaces.

FIGURES 5 and 6 show in plan and perspective views respectively a modified form of the corner connector of the present invention suitable for use at the intersection of three angularly related plane surfaces. Nails or teeth 14 are struck from a single piece metal plate 30 shaped by drawing or other suitable means to form a hollow three sided bottomless pyramid. As in the embodiment described above the angles of teeth 14 with respect to each surface of plate 30 are determined by the particular angles involved in the intersection. These angles are chosen such that when the plate 30 assumes its three dimensional shape the teeth 16 are all parallel as shown with a geometrical line which concurrently bisects all the angles of the corner intersection. The angles indicated for the pyramid shaped plate 30 in FIGURE 6 are for a corner intersection in which all three planes intersect at right angles. The invention is not limited to the inside three surface connector shown in FIGURES 5 and 6 but may be reversed in construction as shown in FIGURE 7 with teeth 14 projecting from the inside surfaces of the pyramid plate 40 to form a similar three surface outside connector.

Figure 8:
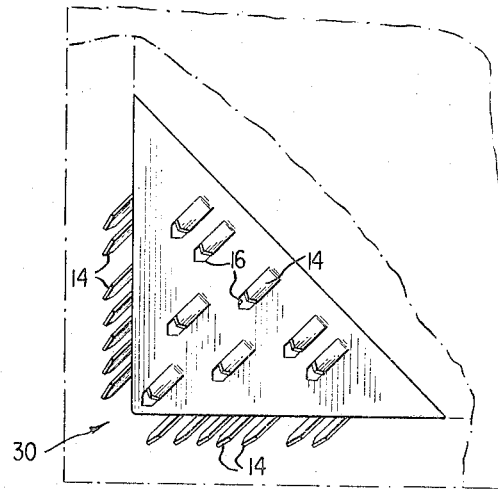
FIGURE 8 shows the connector of FIGURES 5 and 6 applied to an inside corner of a structure.
Figure 9:
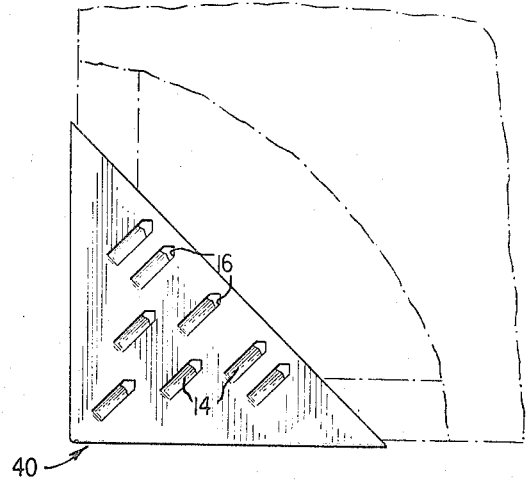
FIGURE 9 shows the connector of FIGURE 7 applied to an outside corner of a structure.

FIGURE 8 shows the connector of FIGURES 5 and 6 applied to an inside corner where three sides of a structure all meet at a 90° angle. FIGURE 9 shows the connector of FIGURE 7 applied to an outside corner with three sides all meeting at a 90° angle.

In the various embodiments the connectors may be formed by deep drawing and then striking the teeth from the plates. Conversely if desired the teeth may be first struck from two or more flat plates and the plates then welded or otherwise suitably joined together at the proper angle or angles. In every case the connector is bent or otherwise shaped to conform as close as possible to the surface of a corner made up of elements to be joined. With nails struck from over substantially the entire area of the connectors firm attachment and great strength can be obtained throughout the joint especially due to the fact that some of the nails penetrate the wood quite close to the juncture of the wood elements. This makes possible a connector requiring no auxiliary holding means such as screws, separate nails or the like.

As a result of the structure and apparatus of the present invention, the multiple advantages of the flat connector disclosed in my patent may be applied with equal facility to corner brackets and structures. Although the connectors illustrated in FIGURES 1 through 3 of the accompanying drawings are adapted to be applied to inside corners only of a structure, it is not intended to limit the scope of the present invention to such applications. Specifically, the structure of the invention may be applied with equal facility to outside corners of structures by merely directing the teeth 14 away from the line 18 instead of directing them toward the line 18.

The plates utilized for my corner connectors are of metal heavy enough to be self supporting in order to provide the true structural load bearing structural joints which my invention comprehends. In some instances the plates may be of lighter gauge metal for use in utility joints such as in boxes and the like rather than in structural joints. The relationships of the length, width, spacing and shape of the teeth or nails are important and are set out and claimed in my aforementioned patent.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

A corner connector comprising a flat metal plate having a plurality of nail-like teeth struck therefrom over substantially its entire area, the plate being bent in the shape of a hollow pyramid to conform with the adjacent surfaces of the corner intersection of three plane bodies, the teeth being struck at an angle from the plate such that the longitudinal axes thereof are mutually parallel upon the bending of the plate.

References Cited by the Examiner

UNITED STATES PATENTS

| | | | |
|---|---|---|---|
| 121,156 | 11/1871 | Cohn | 85—11 |
| 216,237 | 6/1879 | Steinberg | 85—11 |
| 414,715 | 11/1889 | Linderman | 287—20.92 |
| 705,626 | 7/1902 | Vogel | 85—11 |
| 772,149 | 10/1904 | Hunt | 287—20.92 |
| 1,791,337 | 2/1931 | Wendell | 85—13 |
| 2,396,030 | 3/1946 | Terry | 85—13 X |

FOREIGN PATENTS

| | | |
|---|---|---|
| 460,961 | 11/1949 | Canada. |
| 414,303 | 6/1909 | France. |
| 20,400 | 12/1893 | Great Britain. |
| 250,866 | 7/1948 | Switzerland. |
| 302,249 | 12/1954 | Switzerland. |

FRANK L. ABBOTT, *Primary Examiner.*

JACOB L. NACKENOFF, EARL J. WITMER,
*Examiners.*

RICHARD W. COOKE, JR., R. A. STENZEL,
*Assistant Examiners.*